(12) United States Patent
Florencio et al.

(10) Patent No.: US 6,621,866 B1
(45) Date of Patent: Sep. 16, 2003

(54) METHOD FOR INSERTING A VISUAL ELEMENT INTO AN MPEG BIT STREAM

(75) Inventors: Dinei Afonso Ferreira Florencio, Redmond, WA (US); Stuart Jay Golin, East Windsor, NJ (US); Jungwoo Lee, Princeton, NJ (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/494,030

(22) Filed: Jan. 28, 2000

(51) Int. Cl.$^7$ ................................................ H04N 7/12
(52) U.S. Cl. ............................. 375/240.25; 375/240.06
(58) Field of Search ...................... 375/240.02, 240.25, 375/240.06; 348/473, 425.1, 584, 598, 578, 589, 239

(56) References Cited

U.S. PATENT DOCUMENTS

| | | | |
|---|---|---|---|
| 5,264,933 A | 11/1993 | Rosser et al. | 358/183 |
| 5,521,898 A | 5/1996 | Ogasawara | 369/124 |
| 5,802,240 A | 9/1998 | Asai | 386/52 |
| 6,064,764 A | * 5/2000 | Bhaskaran et al. | 382/183 |
| 6,188,728 B1 | * 2/2001 | Hurst | 375/240.16 |
| 6,295,094 B1 | * 9/2001 | Cuccia | 348/559 |
| 6,329,934 B1 | * 12/2001 | Bailleul | 341/51 |
| 6,373,530 B1 | * 4/2002 | Birks et al. | 348/584 |

* cited by examiner

Primary Examiner—Nhon Diep
(74) Attorney, Agent, or Firm—Joseph S. Tripoli; Ronald H. Kurdyla; Vincent E. Duffy

(57) ABSTRACT

A transcoding method for inserting a visual element into an encoded bit stream with minimal decoding of the encoded bit stream. The transcoding method includes the steps of receiving an encoded bit stream containing a picture, partially decoding a copy of the bit stream, determining if a segment of the picture in the bit stream is affected by the insertion of the visual element, re-encoding the segment if the segment is affected by the insertion of the visual element, and outputting the re-encoded bit stream. The encoded and re-encoded bit streams may be MPEG-encoded bit streams. The re-encoded bit stream may be output using a bit rate control process that randomly selects an initial processing point within the re-encoded bit stream, requantizes the re-encoded bit stream using a modified quantization table, and/or utilizes a slice-level stopping criteria for selectively starting or ending bit rate control.

20 Claims, 9 Drawing Sheets

METHOD FOR INSERTING A VISUAL ELEMENT INTO AN MPEG BIT STREAM

GOVERNMENT LICENSE

The U.S. Government has a paid-up license in this invention and the right in limited circumstances to require the patent owner to license others on reasonable terms as provided for by the terms of Government Contract No. 70NANB5H1174 awarded by NIST (National Institute of Standards & Technology).

FIELD OF THE INVENTION

The invention generally relates to a process for modifying coded bit streams. More particularly, the invention is directed to a process for inserting a visual element into a moving pictures group-type 2 ("MPEG 2") encoded video bit stream.

BACKGROUND OF THE INVENTION

Traditionally, broadcast stations insert visual elements (e.g., logos, station identifications, video sequences, and the like) into video signals broadcast to the end viewer. Before the advent of compressed video stream transmission, the insertion of a logo into a broadcast was a relatively straight forward procedure of superimposing or substituting the logo image over a selected portion of a video frame. However, with the advent of compressed video stream transmission (e.g., MPEG-coded video streams) the insertion of logos into video broadcast has become complicated due to temporal dependencies in the coded video stream. In particular, each frame in the video stream no longer contains all the information necessary to reconstruct the video image. Rather, only a few frames (e.g., I frames) in the video stream contain all the information that is needed to re-construct a video image. Other "predictive" frames (e.g., P frames and B frames) reference the portions of the complete frames (e.g., I frames) that are necessary for the reconstruction of the predictive frames, as discussed in further detail below.

One method of inserting a logo into an MPEG-coded video stream is to decode the video stream, insert the logo in the pixel domain, and re-encode the video stream. However, the process of decoding and re-encoding the entire video stream has several drawbacks. One drawback is that the decoding and re-encoding process results in a loss in image quality since errors are introduced into the video stream. These errors are due, in part, to the non-reversible nature of some of the coding techniques (e.g., quantization and inverse quantization). Another drawback is that decoding and re-encoding the entire video stream requires a significant amount of computation.

In addition to the drawbacks discussed above, there is an additional difficulty encountered when inserting a logo into an MPEG-encoded video stream. The insertion of the logo may affect the bit count of the video stream. In particular, the insertion of the logo may cause the bit count of the video stream to increase or decrease and this, in turn, may affect Video Buffer Verifier (VBV) compliance. More specifically, the input buffer of a decoder, under the MPEG standard, has a fixed buffer size and handles transitions between a constant channel bit rate, i.e., the rate at which the video is displayed, and a fluctuating MPEG coded bit rate, i.e., the rate at which the compressed video is passed. Preferably, data flows through the buffer so underflow and overflow conditions are avoided. However, altering the bit count of the MPEG-encoded video stream may cause underflow or overflow conditions to occur in the input buffer of a downstream decoder.

The present invention is directed to overcoming the drawbacks and difficulties discussed above.

SUMMARY OF THE INVENTION

Briefly stated, a transcoding method for inserting a visual element into an encoded bit stream with minimal decoding of the encoded bit stream is provided. The transcoding method includes the steps of receiving an encoded bit stream containing a picture, partially decoding a copy of the bit stream, determining if a segment of the picture in the bit stream is affected by the insertion of the visual element, re-encoding the segment if the segment is affected by the insertion of the visual element, and outputting the re-encoded bit stream. The encoded and re-encoded bit streams may be MPEG-encoded bit streams. The re-encoded bit stream may be output using a bit rate control process that randomly selects an initial processing point within the re-encoded bit stream, requantizes the re-encoded bit stream using a modified quantization table, and/or utilizes a slice-level stopping criteria for selectively starting or ending bit rate control.

In one advantageous embodiment of the invention, a transcoding method for inserting a visual element into an encoded bit stream representing a series of image frames is provided. The transcoding method includes receiving the encoded bit stream, partially decoding the encoded bit stream, inserting the visual element into the partially decoded bit stream, re-encoding the partially decoded bit stream after the visual element is inserted, and outputting the re-encoded bit stream.

In another advantageous embodiment of the invention, a transcoding method for inserting a visual element into an insertion region of an encoded bit stream representing a series of image frames is provided. The transcoding includes receiving a first encoded bit stream, decoding a copy of the first encoded bit stream to determine a position of a segment of an image frame, comparing the insertion region to the position of the segment to determine if the insertion of the visual element would affect the segment, re-encoding the segment if the insertion of the visual element affects the segment, and outputting a second encoded bit stream, the second encoded bit stream being a combination of the first encoded bit stream and the re-encoded segment.

In a further advantageous embodiment of the invention, a transcoding method for inserting a visual element into an insertion region of an encoded bit stream is provided. The transcoding method includes receiving a first encoded bit stream representing an image, decoding a copy of the first encoded bit stream to detect characteristics of respective segments of the image, comparing the characteristics of the segments to the insertion region to determine if the insertion of the visual element into the image would affect the segments, re-encoding the affected segments, and outputting a second encoded bit stream such that the second encoded bit stream contains the same number of bits as the first encoded bit stream, the second encoded bit stream being a combination of the first encoded bit stream and the re-encoded segments.

BRIEF DESCRIPTION OF THE DRAWINGS

The aforementioned advantages of the invention, as well as additional advantages thereof, will be more fully understood as a result of a detailed description of the preferred embodiment when taken in conjunction with the accompanying drawings in which.

DETAILED DESCRIPTION OF THE PREFERRED EMBODIMENT

The characteristics and advantages of the present invention will become more apparent from the following description, given by way of example.

Figure 1:
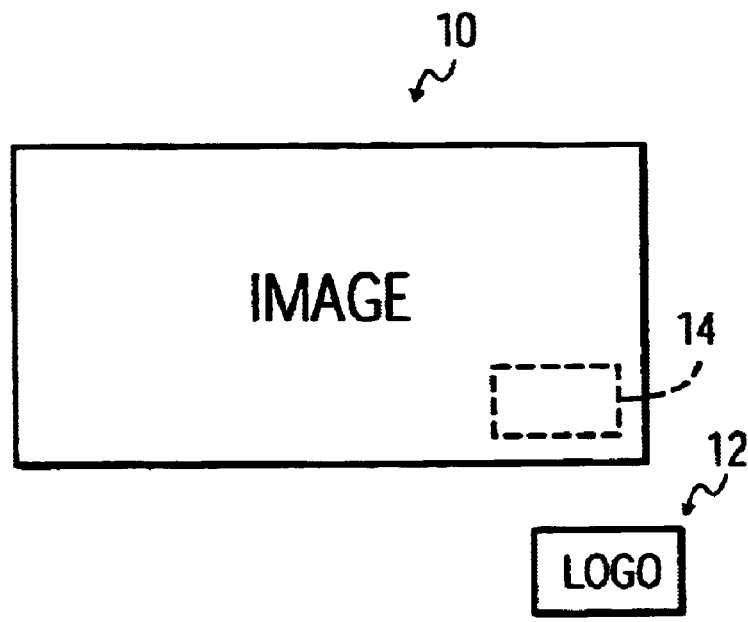
FIG. 1 illustrates an exemplary image and logo of the present invention.

Referring now to FIG. 1, an exemplary image 10 and logo 12 are shown. Image 10 may be contained in a field picture or a frame picture having an I, P, or B structure. For clarity and ease of reference, only frame pictures will be discussed below. An insertion region 14 in image 10 corresponds to the position where logo 12 is to be inserted. As briefly mentioned above, a frame having an I structure is similar to a frame coded as a still image. As such, an I frame contains all the necessary image data needed for the reconstruction of the image contained within it. A frame having a P structure is known as a predicted frame and requires, for reconstruction, the image data contained in the most recently reconstructed I or P frame. A frame having a B structure is known as a bidirectional frame and is predicted from the closest two I and/or P frames, one in the past and one in the future. Therefore, a B frame requires the image data contained in two other frames (I and/or P) for reconstruction.

Figure 2:
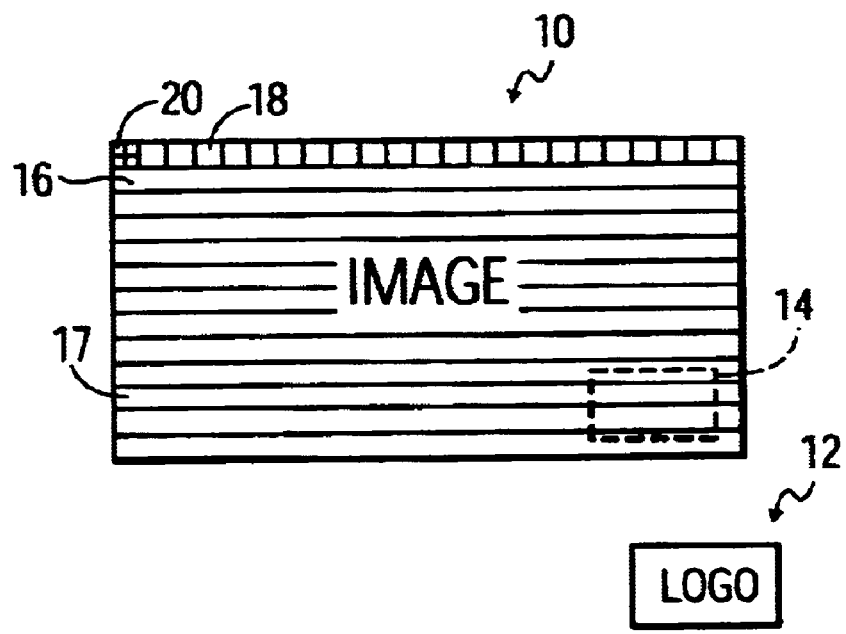
FIG. 2 is illustrates pixel macroblock slices, macroblocks, and blocks in the FIG. 1 image.

Referring now to FIG. 2, image 10 is encoded as an I, P, or B frame and passed in an encoded bit stream as a series of macroblock slices 16. Each macroblock slice 16 contains luminance and chroma data for a horizontal group of pixel macroblocks 18. Each pixel macroblock 18 has a size of 16×16 pixels (not shown) and is made up of four blocks 20 of luminance and two blocks of chrominance (one Cr and one Cb) covering the same area. Thus a transcoder implementing the method of the present invention receives an encoded video bit stream as a series of macroblock slices 16. Although an exemplary transcoder is not shown, the implementation of the present invention in a conventional MPEG transcoder is considered within the ability of one skilled in the art.

Figure 3:
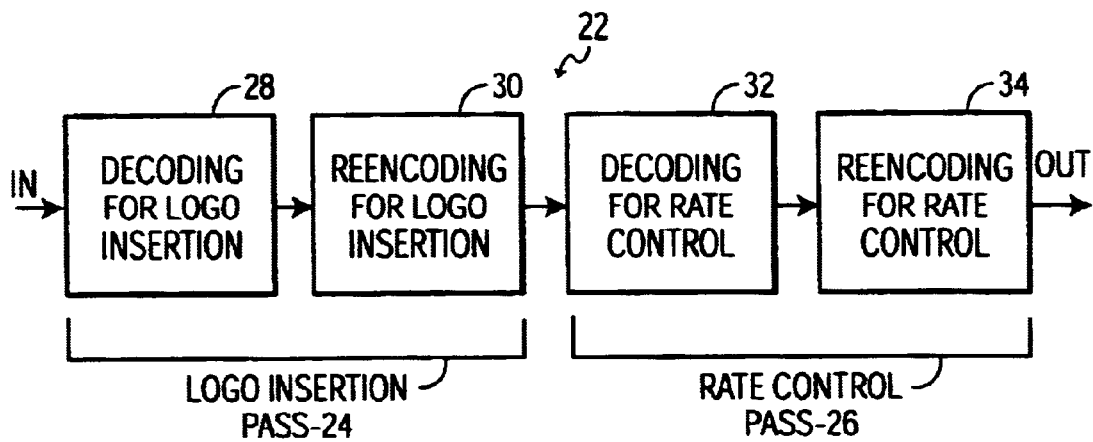
FIG. 3 is a block diagram illustrating a logo insertion process of the present invention.

Referring now to FIG. 3, in conjunction with FIG. 2, an overall logo insertion process 22 of the present invention is shown. Logo insertion process 22 includes a logo insertion pass 24 and a rate control pass 26. As discussed in further detail below, logo insertion pass 24 includes a decoding step 28 and a re-encoding step 30. Generally, decoding step 28 includes partially decoding an incoming encoded video stream and determining if a segment (e.g., macroblock slice 16, macroblock 18, or a block 20) of the video stream overlaps or is otherwise affected by the insertion of logo 12. If the segment is not affected by the insertion of logo 12, the encoded segment by-passes decoding step 28 and re-encoding step 30 and is stored in a temporary buffer. However, if the segment (e.g., macroblock slice 17) is affected by the insertion of logo 12, the affected portion of the segment, during decoding step 28, is decoded up to the pixel domain and logo 12 is combined with, or otherwise assimilated into, the affected portion of the decoded segment. Afterwards, during re-encoding step 30, the segment, now containing logo 12 or logo related data (e.g., motion vector information), is re-encoded and stored in the temporary buffer.

Next, during rate control pass 26, the encoded and re-encoded segments of the video stream are output from the temporary buffer such that the re-encoded segments are inserted into their original positions in the encoded video stream. During a decoding step 32, the segments of the encoded video bit stream are decoded up to the DCT domain. In the DCT domain the DCT coefficients of the segments are requantized using different quantization scalars, as discussed in further detail below. After requantization, the decoded segments, during a re-encoding step 34, are re-encoded and stored in a temporary buffer. The re-encoded segments are then output via a selective rate control that is enabled or disable based on characteristics of the requantized segments, as discussed in further detail below.

Although logo insertion pass 24 is illustrated as being distinct from rate control pass 26, one skilled in the art will readily devise that logo insertion pass 24 may be integrated with the rate control pass to further reduce the computational cost of the overall logo insertion process 22. However, logo insertion pass 24 and rate control pass 26 are illustrated as distinct passes for clarity, ease of reference, and to facilitate an understanding of the present invention.

Figure 4:
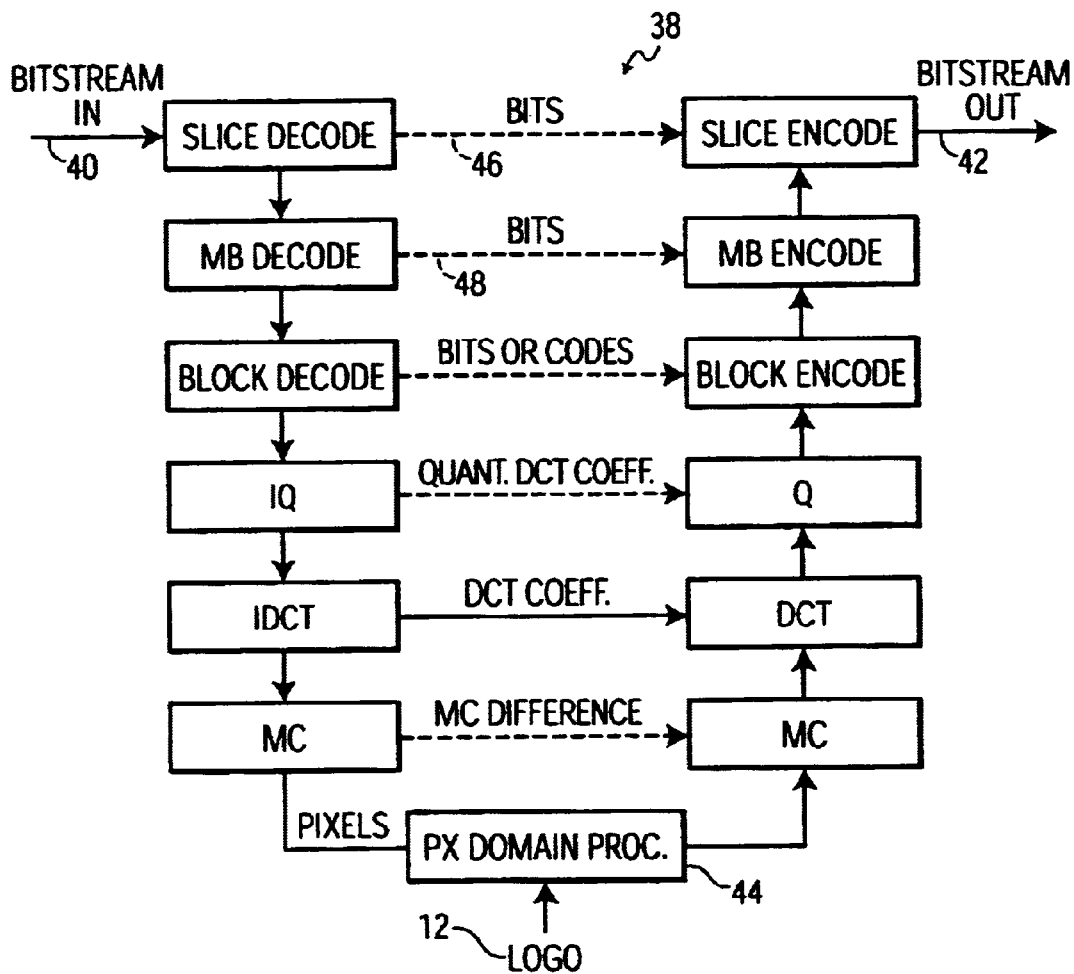
FIG. 4 is a is a flow diagram illustrating a by-pass process of the present invention.

Referring now to FIG. 4, in conjunction with FIG. 2, a partially decoding process 38 of the insertion method of the present invention is illustrated. Data in an incoming bit stream 40 is passed through a transcoder at the highest level possible. For example, an encoded macroblock slice 16 that does not overlap, or is not otherwise affected by, insertion region 14 of logo 12 is passed through the transcoder in the macroblock slice domain 46 and stored as an encoded macroblock slice. If a portion of a macroblock slice (e.g., macroblock slice 17) is found to overlap, or to be otherwise affected by, the logo's insertion region 14, the macroblock slice is decoded into the macroblock domain 48 and any macroblocks 18 that don't overlap the logo's insertion region 14 are passed through the transcoder in the macroblock domain 48 and stored as encoded macroblocks. Furthermore, in the macroblock domain 48 any motion vectors affected by the logo's insertion region 14 are processed, as discussed in further detail below. This by-passing process continues up to pixel domain 44 where the pixels in the overlapping portion of the macroblock slice are combined with logo 12. Afterwards, the pixels are re-encoded down to macroblock slice domain 46 such that encoded and re-encoded blocks are combined into re-encoded macroblocks, encoded and re-encoded macroblocks are combined into re-encoded macroblock slices, and encoded and re-encoded macroblock slices are passed in an outgoing bit stream 42. Thus, partially decoding process 38 of the present invention facilitates the insertion of logo 12 into an MPEG bit stream 40 without fully decoding the entire bit stream and, as a result, reduces the complexity, cost, time, and re-coding loss traditionally encountered during logo insertion.

Figure 5:
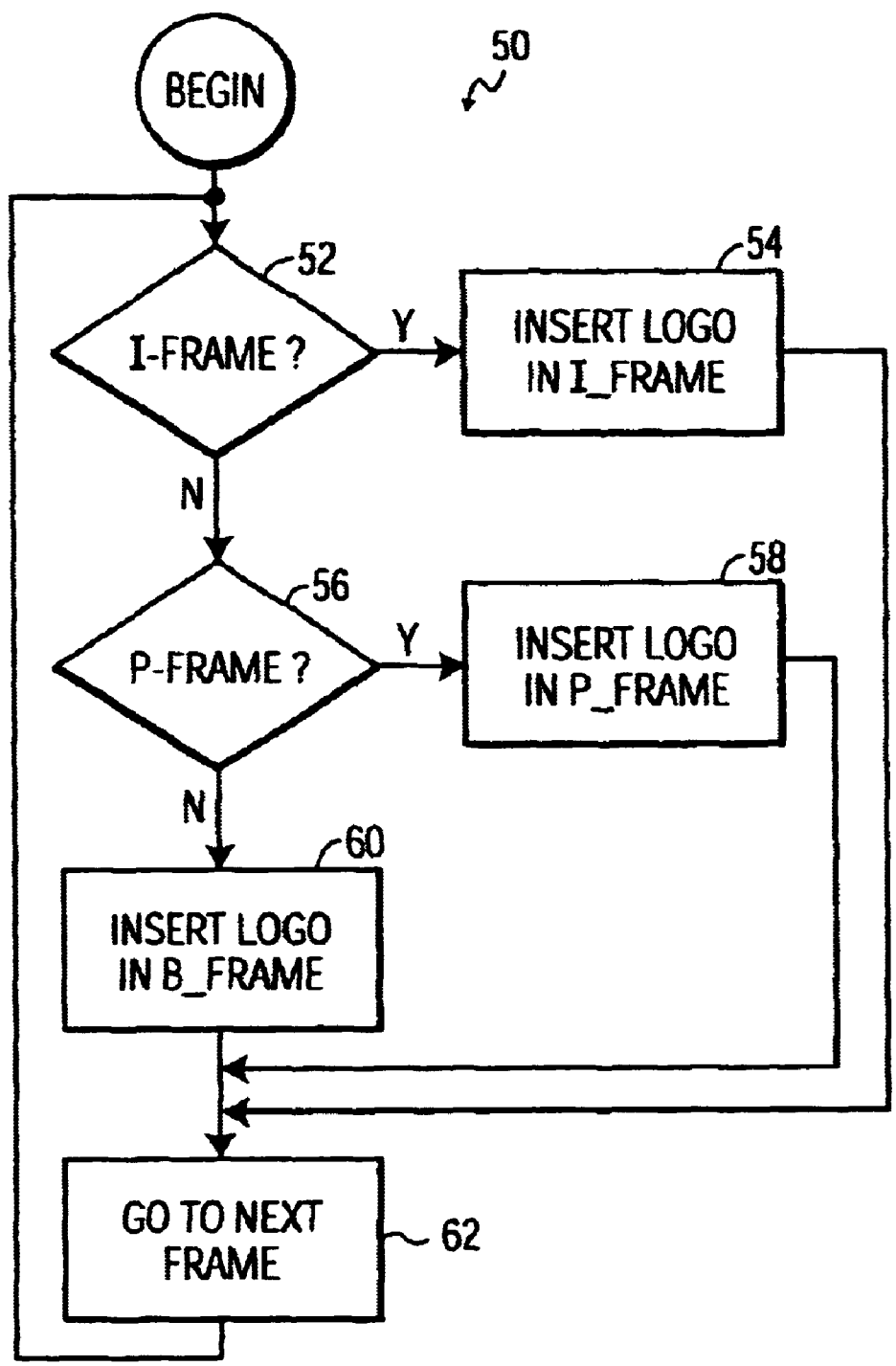
FIG. 5 is a flowchart illustrating a frame determination process of the present invention.

Referring now to FIG. 5, a general overview of the visual element insertion process 50 is illustrated. As illustrated, at step 52, the transcoder examines an incoming frame to determine if the frame is an I frame. If so, the transcoder, at step 54, carries out the process illustrated in FIG. 6. If not, the transcoder, at step 56, determines if the incoming frame is a P frame. If the incoming frame is a P frame, the transcoder, at step 58, carries out the process illustrated in FIG. 7. If the incoming frame is not a P frame, the transcoder, at step 60, determines that the incoming frame is a B frame and carries out the process illustrated in FIG. 8. Frame type may be determined by examining picture or frame header data accompanying respective coded frames. As discussed in further detail below, after the visual element has been inserted into the incoming frame, the transcoder, at step 62, repeats the process illustrated in FIG. 5 to determine the frame type of the next incoming frame. This process continues until the insertion of the visual element into the incoming bit stream is completed.

Figure 6:
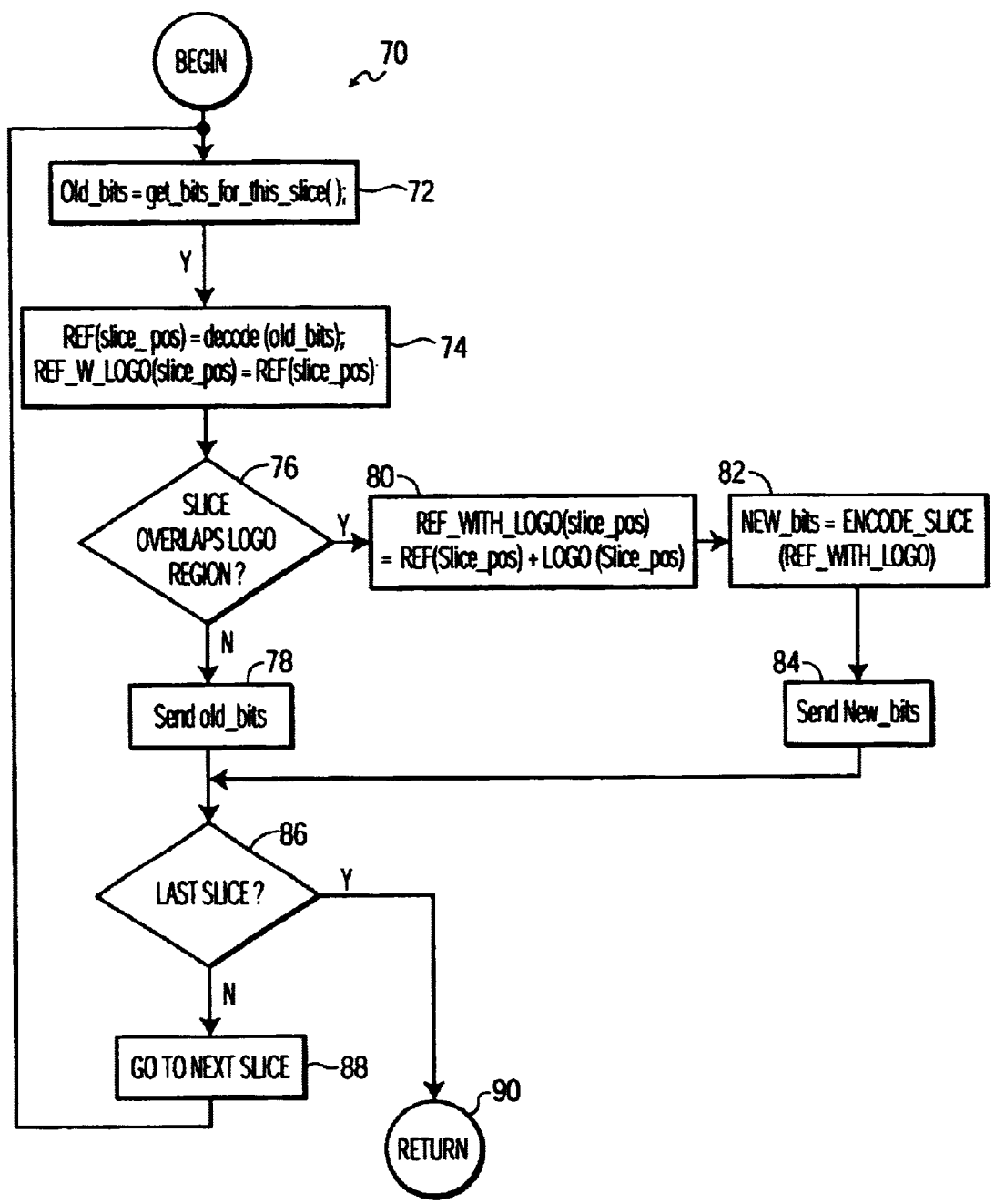
FIG. 6 is a flowchart illustrating a logo insertion process for an I frame of the present invention.

Referring now to FIG. 6, an I frame insertion process 70 is shown. First, at step 72, the transcoder stores and copies the encoded bits of a macroblock slice of the incoming I-frame. Next, at step 74, the transcoder decodes the copy of the encoded bits of the macroblock slice and stores two copies of the decoded slice in memory. The first copy is stored in a "Ref (slice_pos)" block of memory. The decoded macroblock slices stored in the "Ref (slice_pos)" block of memory may be utilized for decoding macroblocks in later frames as is done in a standard MPEG decoder. The second copy is stored in a "Ref_w_logo (slice_pos)" block of memory and may be utilized for re-encoding macroblocks in later frames that are affected by the logo insertion, as discussed in further detail below. At step 76, the transcoder determines whether the decoded macroblock slice overlaps the logo's insertion region 14. If not, at step 78, the transcoder passes the encoded bits of the macroblock slice that were previously stored. If so, at step 80, the transcoder combines the overlapping portions of logo 12 and the macroblock slice (e.g., macroblock slice 17), as discussed above, and overwrites the previous content of the "Ref_w_logo (slice_pos)" block of memory with this new data. It should be noted that the combining step may represent, but is not limited to, a replacement or mixing operation. It should be further noted that logo 12 may advantageously be in encoded form (e.g., an encoded macroblock) if the combining step is a replacement operation since replacing the macroblock slice with macroblock portions of logo 12 in the macroblock domain requires less computation than replacing the macroblock slice with pixel portions of logo 12 in the pixel domain. To further reduce unnecessary computations the logo insertion region 14 may be sized to align with upper and lower boundaries of overlapping macroblock slices to ensure that the entire logo replacement operation occurs in the macroblock domain. At step 82 the transcoder re-encodes the combination of logo 12 and the overlapping macroblock slice and, at step 84, passes the re-encoded combination, as discussed above. DC quantization values undergo DPCM (Differential Pulse Code Modulation) across a macroblock slice. Thus, a macroblock to the right of a re-encoded macroblock (i.e., the macroblock combined and re-encoded with a portion of logo 12) must also be re-encoded to account for the change in the DC quantization value of the macroblock containing the logo. Next, at step 86, the transcoder determines whether the current macroblock slice is the last macroblock slice in the I frame. If not, at step 88, the transcoder returns to step 72 to store and copy the next encoded macroblock slice of the I frame. If so, at step 90, the transcoder returns to the process illustrated in FIG. 5 and begins to examine the next frame.

Figure 7:
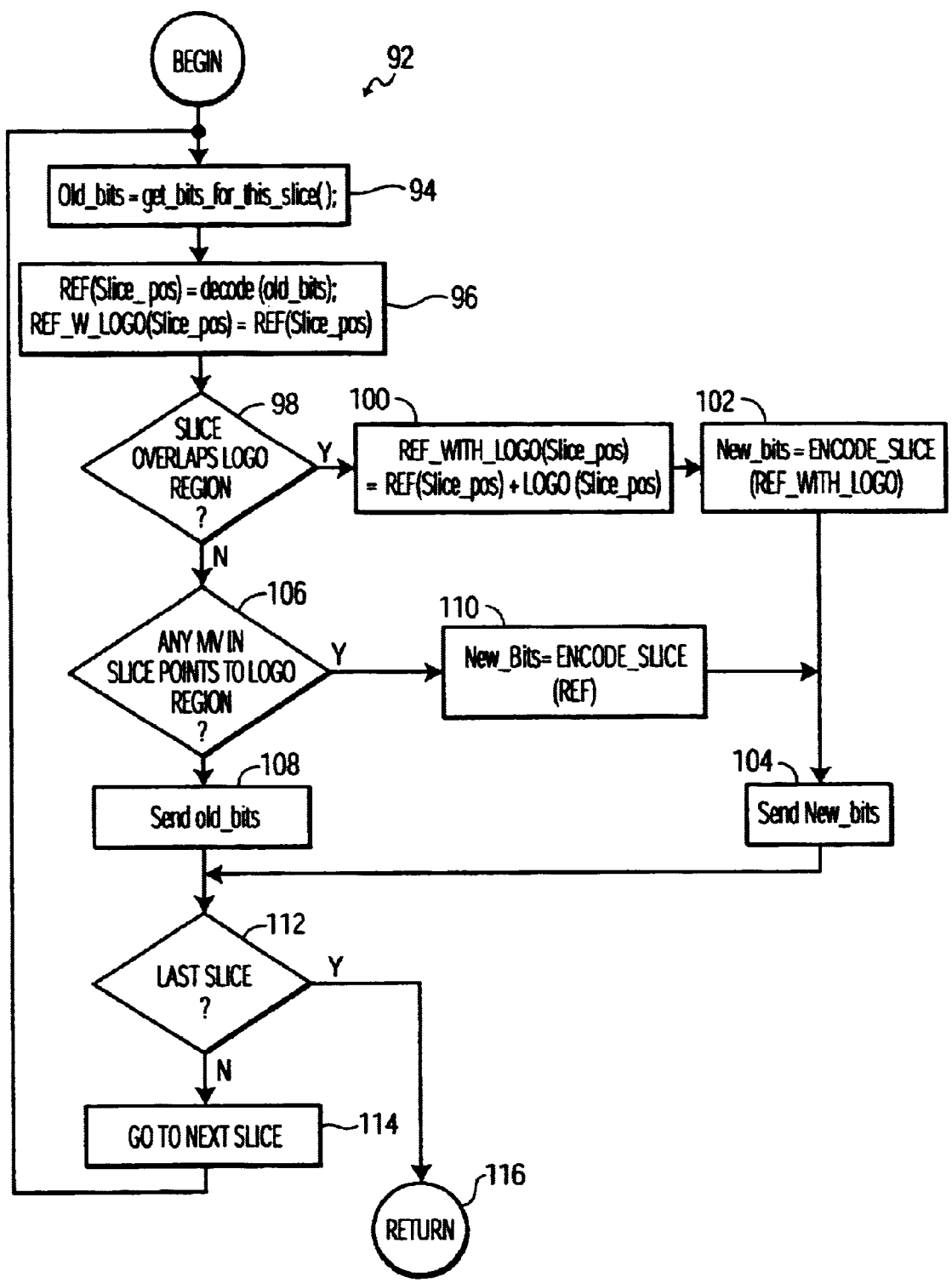
FIG. 7 is a flowchart illustrating a logo insertion process for a P frame of the present invention.

Referring now to FIG. 7, a P frame insertion process 92 is shown. First, at step 94, the transcoder stores and copies the encoded bits of a macroblock slice of the incoming P frame. Next, at step 96, the transcoder decodes the copy of the encoded bits of the macroblock slice and stores two copies of the decoded slice in memory. The first copy is stored in a "Ref (slice_pos)" block of memory. The decoded macroblock slices stored in the "Ref (slice_pos)" block of memory may be utilized for decoding macroblocks in later frames as is done in a standard MPEG decoder. Although completely decoding P frame segments is disclosed, it is considered within the scope of the present invention to use other techniques for re-encoding later frames that are affected by the insertion of logo 12. For example, the transcoder may store encoded P frames and decode selected parts of the P frame on an as needed basis. The second copy is stored in a "Ref_w_logo (slice_pos)" block of memory and may be utilized for re-encoding macroblocks in later frames that are affected by logo insertion, as discussed in further detail below.

At step 98 the transcoder determines whether the position of the second copy of the decoded macroblock slice overlaps the logo's insertion region 14. If so, at step 100, the transcoder combines the overlapping portions of logo 12 and the macroblock slice (e.g., macroblock slice 17) and overwrites the previous content of the "Ref_w_logo (slice_pos)" block of memory with this new data. Afterwards, at step 102, the transcoder re-encodes the combination of logo 12 and the overlapping macroblock slice using a previously encoded anchor frame (e.g., I-frame or P-frame) that contains the logo and, at step 104, passes the re-encoded combination, as discussed above. As previously noted, the combination may represent, but is not limited to, a replacement or mixing operation. In an alternative approach, the transcoder may set a motion vector, associated with the overlapping macroblock, to zero to avoid the computational cost of the motion vector search process. In either case, it should be noted that the motion vector and DC quantization values are DPCM across a macroblock slice. Therefore, if a motion vector and/or macroblock is re-encoded the next unskipped motion vector and/or macroblock must be differentially encoded to account for the re-encoding of the motion vector and/or macroblock.

If the transcoder determines that no overlap exists the transcoder, at step 106, determines whether there are any motion vectors in the macroblock slice that point to the logo's insertion region 14. If not, at step 108, the transcoder passes the encoded macroblock slice that was previously stored. If so, at step 110, the transcoder preferably re-encodes the affected macroblocks using the reference frames that were previously saved in the "Ref w/ logo" block of memory. As discussed above, the previously stored macroblocks are macroblocks of earlier I or P frames that were stored and modified by logo insertion. In an alternative procedure, the transcoder may set motion vectors pointing to the logo insertion region 14 to zero. This alternative procedure would reduce the computations otherwise needed for re-encoding the affected macroblocks. Furthermore, motion vector extrapolation techniques may also be utilized to reduce computation costs. One exemplary motion vector extrapolation technique is disclosed in applicant's U.S. patent application Ser. No. 026,140, filed Feb. 20, 1998, entitled "Motion Vector Extrapolation For Transcoding Video Sequences" and hereby incorporated herein by reference. In any case, it should be noted that the motion vector and DC quantization values are DPCM across a macroblock slice. Therefore, if a motion vector and/or macroblock is re-encoded the next unskipped motion vector and/or macroblock must be differentially encoded to account for the re-encoding of the motion vector and/or macroblock. At step 104 the transcoder passes the re-encoded macroblock slice.

After the stored macroblock slice or re-encoded macroblock slice is passed, the transcoder determines, at step 112, whether the current macroblock slice is the last macroblock slice in the P frame. If not, at step 114, the transcoder returns to step 94 to store and copy the next encoded macroblock slice in the P frame. If so, at step 116, the transcoder returns to the process of FIG. 5 and begins the examination of the next frame.

Figure 8:
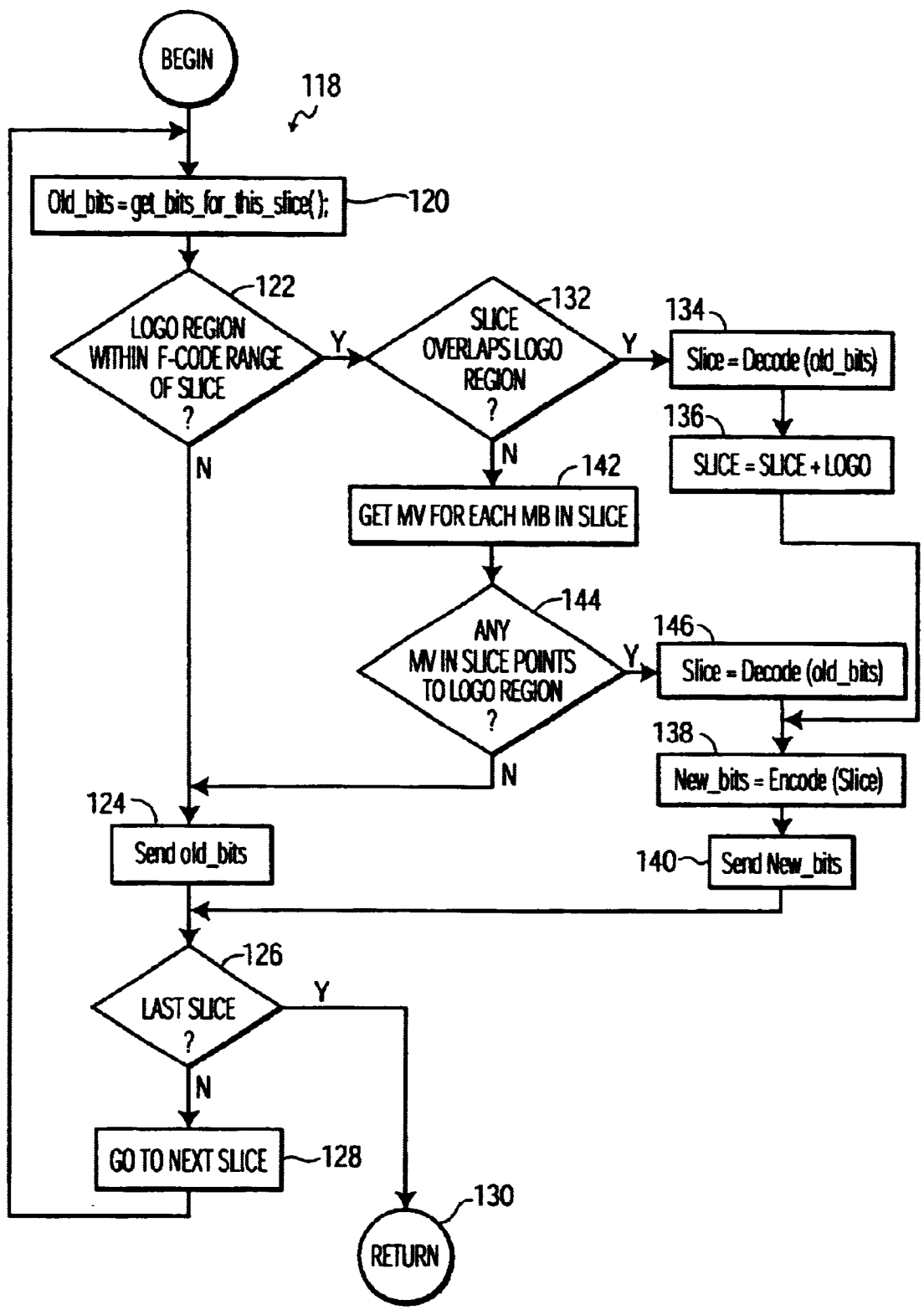
FIG. 8 is a flowchart illustrating a logo insertion process for a B frame of the present invention.

Referring now to FIG. 8, a B frame insertion process 118 is shown. Initially, at step 120, the transcoder stores and copies the encoded macroblock slice of the incoming B frame. Next, at step 122, the transcoder determines if insertion region 14 of logo 12 is within the f-code range of the macroblock slice. The f-code range is contained in the picture header. If not, at step 124, the transcoder passes the stored macroblock slice and determines, at step 126, whether the current macroblock slice is the last macroblock slice in the B frame. If the current macroblock slice is not the last macroblock slice in the B frame then, at step 128, the transcoder returns to step 120 to store and copy the next encoded macroblock slice in the B frame. If the current macroblock slice is the last macroblock slice in the B frame then, at step 130, the transcoder returns to the process illustrated in FIG. 5 and begins the examination of the next frame.

If insertion region 14 of logo 12 is within the f-code range the transcoder, at step 132, determines if the macroblock slice overlaps insertion region 14 of logo 12. If so, at step 134, the transcoder decodes the macroblock slice and, at step 136, combines the overlapping portions of the macroblock slice (e.g., macroblock slice 17) and logo 12. Afterwards, at step 138, the transcoder re-encodes the combination of logo 12 and the overlapping macroblock slice using previously encoded anchor frames (e.g., I-frames and/or P-frames) that contain logo 12 and, at step 140, passes the re-encoded combination. As previously noted, the combination may represent, but is not limited to, a replacement or mixing operation. In an alternative approach, the transcoder may set the motion vectors associated with each overlapping macroblock to zero to avoid the computational cost of the motion vector search process. In either case, as discussed above, the next unskipped motion vector and/or macroblock must be differentially encoded.

If, at step 132, the transcoder determines that the macroblock slice does not overlap insertion region 14 of logo 12, the transcoder, at step 142, acquires the motion vectors for each macroblock in the macroblock slice. Next, at step 144, the transcoder determines if there are any motion vectors that point to insertion region 14 of logo 12. If not, at step 124, the transcoder passes the encoded macroblock slice that was previously stored and, at step 126, determines if the current macroblock slice is the last macroblock slice in the B frame. If there are motion vectors pointing to the insertion region the transcoder, at step 146, decodes the relevant portion of the macroblock slice (i.e., the macroblocks having the relevant motion vectors) and, at step 138, preferably re-encodes the affected reference frames that were previously stored in the "Ref w/ logo" block of memory. As discussed above, the previously stored macroblocks are macroblocks of earlier I or P frames that were stored and modified by the logo insertion. In an alternative procedure, the transcoder may examine the motion vectors (forward and backward) of each macroblock to determine if a motion vector that doesn't point to insertion region 14 exists. If such a motion vector is detected, the transcoder may discard all other motion vectors for the macroblock. In another alternative procedure, the transcoder may set the motion vectors of each affected macroblock to zero. Both alternative procedures would reduce the computations otherwise needed for re-encoding the affected macroblocks. In any case, as discussed above, the next unskipped motion vector and/or macroblock must be differentially encoded. Afterwards, at step 140, the transcoder passes the re-encoded macroblock slice and, at step 126, determines whether the current macroblock slice is the last macroblock slice in the B frame.

Figure 9:
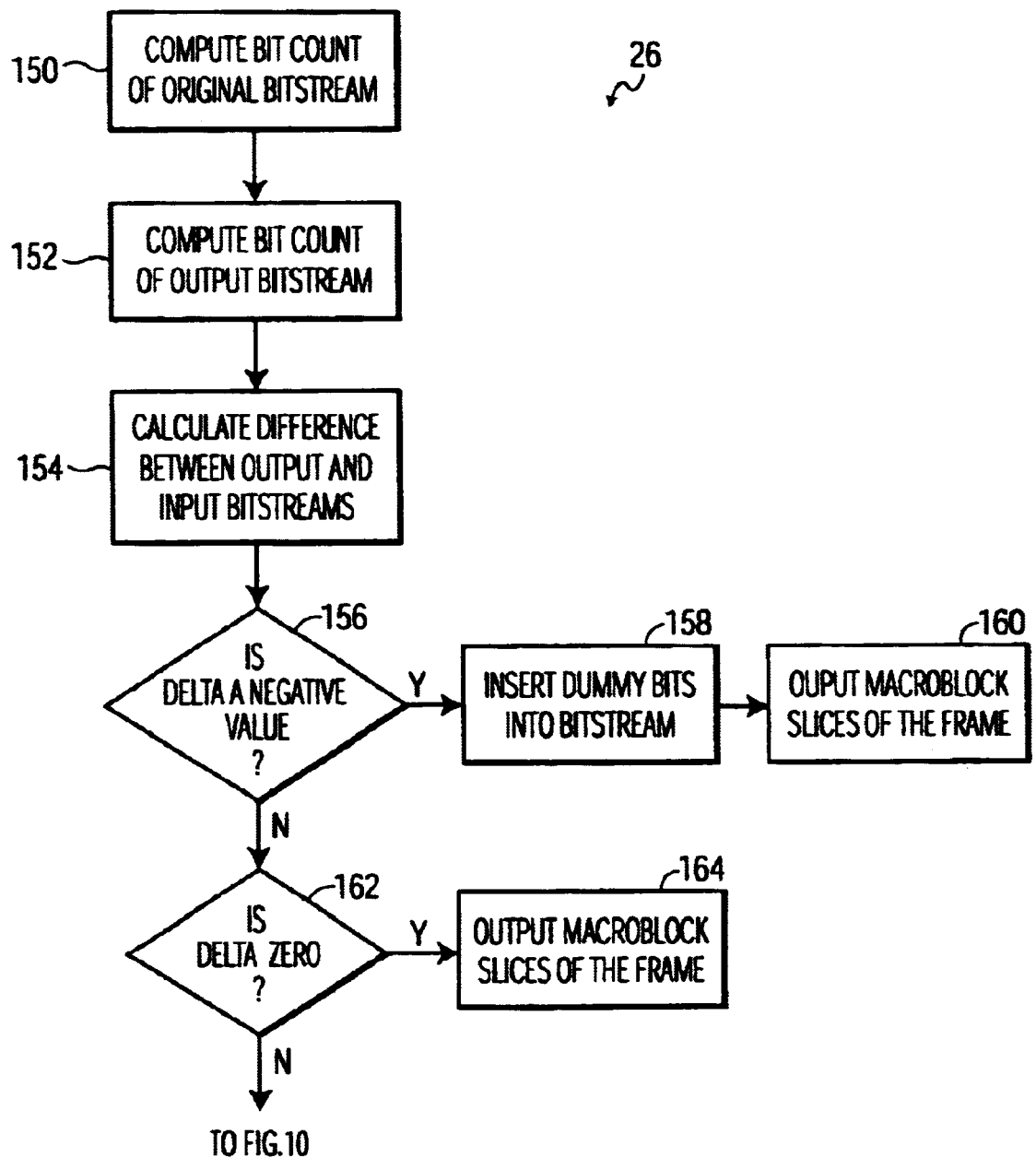
FIGS. 9, 10 and 11 are flowcharts illustrating a rate control process of the present invention.
Figure 10:
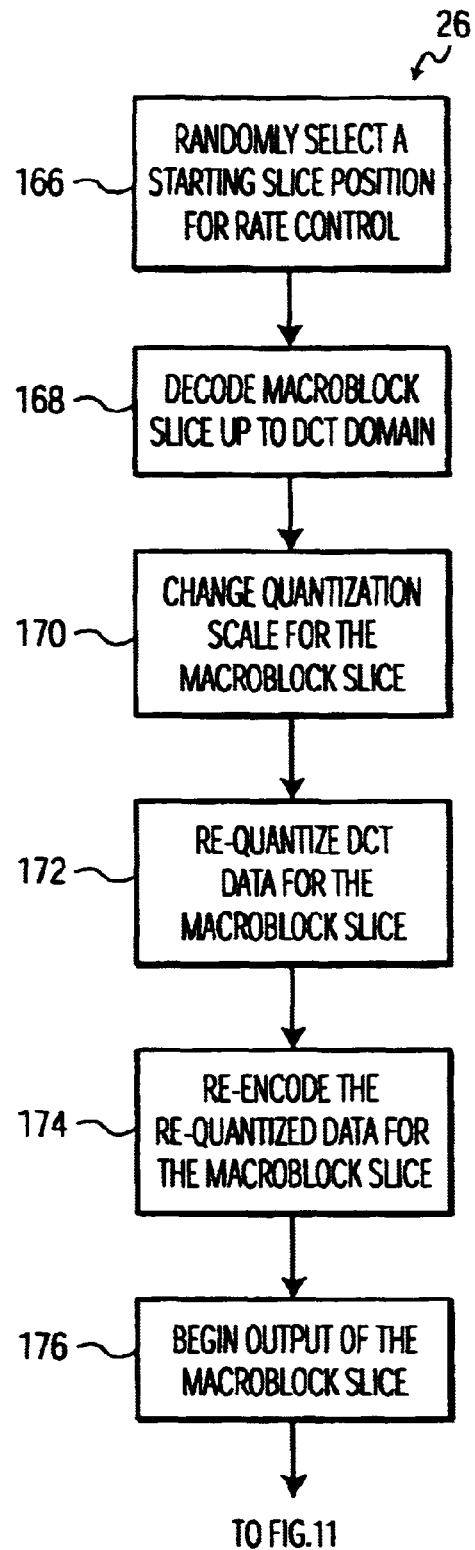
Figure 11:
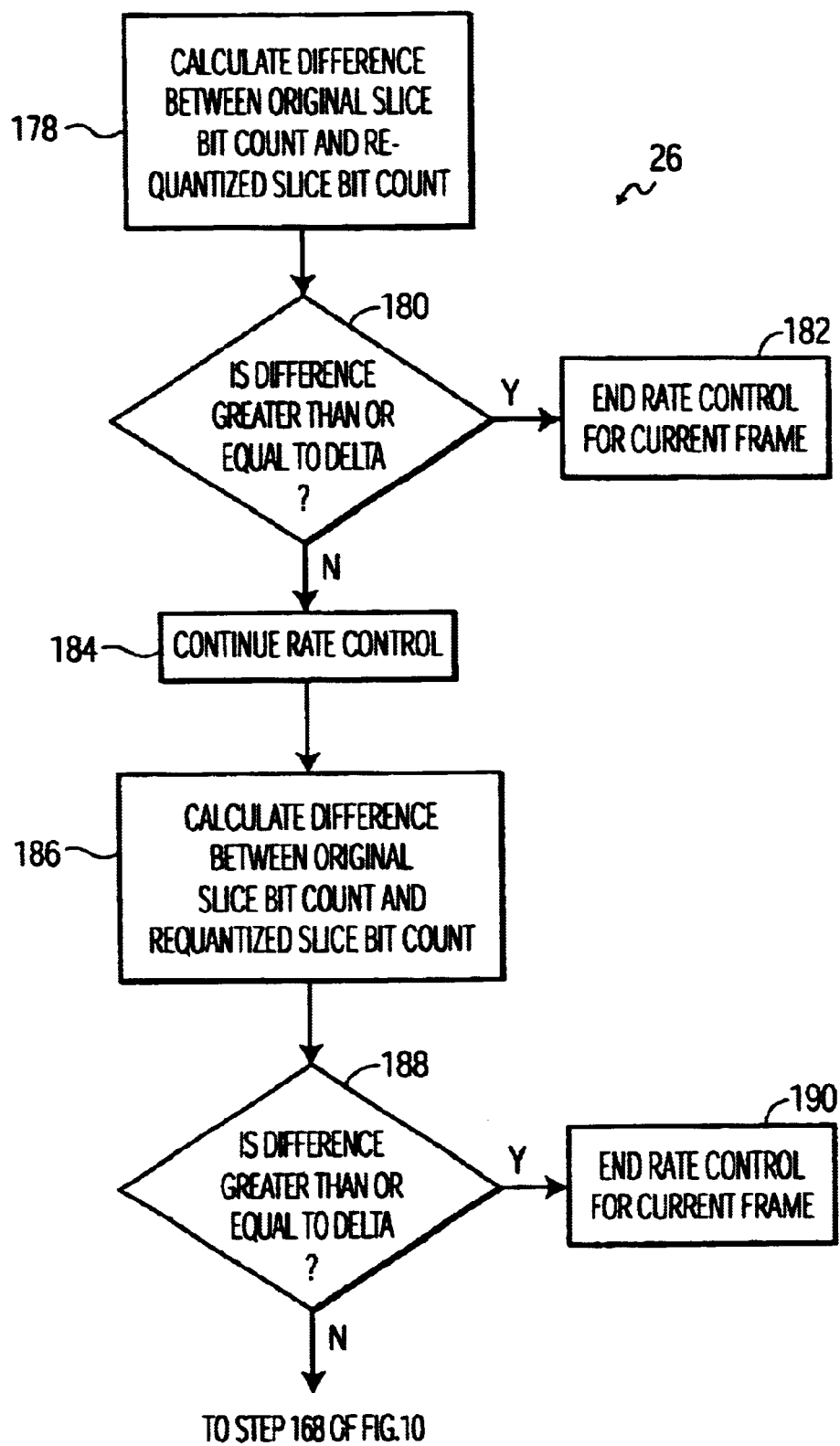

Referring now to FIGS. 9, 10, and 11, the rate control pass 26 of the present invention is shown in further detail. As discussed above, the affected segments of an incoming encoded bit stream are partially decoded and re-encoded for logo insertion prior to rate control pass 26. More specifically, the affected region for I frames is that region containing slices that overlap the logo insertion region 14. For P and B frames, the affected region is the region encompassing slices which contain macroblocks that overlap, or have motion vectors pointing to, the logo insertion region 14. As a result, the outgoing bit stream may not have the same bit count as the original incoming bit stream. However, maintaining the same bit count for the input and output bit streams is desirable for a number of reasons. One reason is that if the same bit count is maintained for each frame (e.g., I, P, or B frame), the transport stream header can be re-used for the outgoing bit stream since data in the header (e.g., DTS data, PTS data, etc. . . ) will not change. Another reason is that the VBV compliance of an incoming bit stream will be maintained for an outgoing bit stream if the bit count for the frames of both bit streams is the same. Thus, rate control pass 26 permits the re-use of the transport stream header and maintains the VBV compliance of the video bit stream. However, it should be noted that rate control pass 26 is an exemplary rate control process of the present invention and that other rate control processes may be used to facilitate transport stream header re-use and/or VBV compliance without departing from the spirit and scope of the present invention, as defined in the appended claims.

Turning now to FIG. 9, the transcoder initially, at step 150, computes the bit count of a frame in the original input bit stream, i.e., the bit count of the frame in the video bit stream prior to the insertion of logo 12. Next, at step 152, the transcoder computes the bit count of a corresponding frame in the output bit stream affected by the insertion of logo 12 as well as the bit counts of the macroblock slices of the corresponding frame. At step 154 the transcoder calculates the difference (delta) between the bit count of the frame in the output bit stream and the input bit stream. Delta represents the number of bits that the output bit stream must be reduced by or increased by to ensure that the number of bits of the frame (post logo insertion) in the output bit stream is equal to the number of bits of the frame (pre logo insertion) in the input bit stream. At step 156 the transcoder determines if delta is negative. If delta is negative the number of bits in the input bit stream is greater than the number of bits in the output bit stream and the transcoder, at step 158, inserts dummy bits into the output bit stream to ensure that the output bit stream is equal to the input bit stream. Afterwards, at step 160, the transcoder outputs macroblock slices of the re-encoded frame.

If delta is not negative the transcoder, at step 162, determines if delta is zero. When delta is zero the number of bits in the input bit stream is equal to the number of bits in the output bit stream and the transcoder, at step 164, outputs macroblock slices without using rate control.

Turning now to FIG. 10, if delta is positive the transcoder, at step 166, randomly selects a starting slice position for bit rate control. When delta is positive the number of bits in the output bit stream is greater than the number of bits in the input bit stream and the transcoder must reduce the number of bits in the output bit stream. By randomly selecting a starting slice position, the transcoder minimizes perceptual problems (e.g., cyclic patterns or breathing errors) that are generated when the same initial slice location is constantly distorted. However, it is considered within the scope of the present invention to process the macroblock slices in a fixed or sequential manner. Next, at step 168, the transcoder retrieves the selected slice from the memory buffer and decodes the selected slice up to the DCT domain. Afterwards, the transcoder, at step 170, adjusts the quantization scales of each macroblock in the decoded slice and, at step 172, requantizes the DCT data of the macroblocks in the decoded slice. The adjustment involves dividing the DCT coefficients by a predetermined integer and multiplying the quantization scale by the same predetermined integer. The predetermined integer may be a fixed integer that remains constant during the processing of the macroblock slices in the current frame. Alternatively, the predetermined integer may be a variable integer that increases in magnitude as the number of processed slices for the current frame increases. Increasing the magnitude of the predetermined integer on a slice by slice basis reduces the computational complexity and processing time for controlling the bit rate of each frame since the number of macroblock slices that are processed, via rate control, is reduced. One exemplary adjustment, using a fixed integer, is halving the DCT coefficients and multiplying the quantization scales by a factor of two. Halving the DCT coefficients generally reduces the bit count since smaller coefficient values tend to require shorter codes. To restore the coefficients to their approximate value the quantization scales are multiplied by a factor of two prior to re-quantization. At step 174 the transcoder re-encodes the requantized DCT data into a video bit stream and, at step 176, outputs the bit stream.

Turning now to FIG. 11, rate control pass 26 continues with the transcoder, at step 178, maintaining a record of the bit count of an outgoing slice and calculating the difference between the bit count of the original slice (prior to re-quantization) and the current slice (post re-quantization) at a first predetermined position (e.g., midway through the slice). Next, at step 180, the transcoder determines if the calculated difference is greater than or equal to the delta value previously calculated. If so, the transcoder, at step 182, ends the rate control for the current frame and passes the rest of the frame using the original quantization values. The rate control is ended because the number of bits output in the current frame (i.e., post log insertion) is less than or equal to the number of bits in the original frame (i.e., pre logo insertion). It should be noted that dummy bits may be inserted into the output bit stream as needed. If the calculated difference is less than the delta value previously calculated, the transcoder, at step 184, continues to process the slice via rate control. Next, at step 186, the transcoder calculates, at a second predetermined position (e.g., at the end of the slice), the difference between the bit count of the original slice (prior to re-quantization) and the current slice (post re-quantization). At step 188 the transcoder determines if the calculated difference is greater than or equal to the delta value previously calculated. If so, the transcoder, at step 190, ends the rate control for the current frame and passes the rest of the frame using the original quantization values. The rate control is ended because the number of bits output in the current frame (post log insertion) is less than or equal to the number of bits in the original frame (pre logo insertion). Again, it should be noted that dummy bits may be inserted into the output bit stream as needed. If the calculated difference is less than the delta value previously calculated, the transcoder returns to step 168 and begins to process the next slice via rate control.

A distortion may be introduced when a macroblock is requantized. This distortion will propagate to any other macroblock block using the requantized macroblock for motion compensation. This distortion is not significant, but for some applications compensating for the distortion may be desired. To compensate, subsequent macroblocks pointing to the requantized region will have to be re-encoded, in a manner similar to the one previously described for logo insertion.

While the present invention has been described with reference to the preferred embodiments, it is apparent that that various changes may be made in the embodiments without departing from the spirit and the scope of the invention, as defined by the appended claims.

What is claimed is:

1. A transcoding method for inserting a visual element into an encoded bit stream representing a series of image frames, each image frame having a plurality of segments, the transcoding method comprising the steps of:

receiving the encoded bit stream;

partially decoding the encoded bit stream;

inserting the visual element into the partially decoded bit stream;

determining if a motion vector is affected by the insertion of the visual element into the partially decoded bit stream;

modifying the affected motion vector or a segment associated with the affected motion vector;

re-encoding the partially decoded bit stream; and outputting the re-encoded bit stream.

2. The transcoding method of claim 1, wherein the encoded bit stream is an MPEG encoded video bit stream.

3. The transcoding method of claim 1, wherein the visual element is one of a logo, a textual display, an image, and a video sequence.

4. The transcoding method of claim 1, wherein the step of modifying includes one of setting the motion vector to zero, discarding the motion vector, and re-encoding the segment associated with the affected motion vector.

5. The transcoding method of claim 1, wherein the segment is one of a macroblock slice, a macroblock, and a block.

6. The transcoding method of claim 1, wherein the step of inserting includes substituting the visual element for image data in an image frame.

7. The transcoding method of claim 6, wherein the step of substituting the visual element for the image data occurs in the pixel domain.

8. The transcoding method of claim 6, wherein the step of substituting the visual element for the image data occurs in the macroblock domain.

9. The transcoding method of claim 1, wherein the step of inserting includes mixing the visual element with image data in an image frame.

10. The transcoding method of claim 1, wherein the step of outputting the re-encoded bit stream includes the steps of:

controlling an output bit rate of the re-encoded bit stream such that each frame in the re-encoded bit stream contains the same number of bits as each corresponding frame in the encoded bit stream.

11. The transcoding method of claim 10, wherein the step of controlling the output bit rate includes the steps of:

calculating a first bit count for a frame in the encoded bit stream;

calculating a second bit count for a corresponding frame in the re-encoded bit stream;

calculating a difference between the first bit count and the second bit count; and modifying the bit rate of the re-encoded bit stream to eliminate the calculated difference in bit count from the re-encoded bit stream.

12. The transcoding method of claim 11, wherein the step of modifying the bit rate includes the steps of:

adjusting a quantization scale factor of the re-encoded bit stream; and requantizing portions of the re-encoded bit stream in accordance with the adjusted quantization scale.

13. The transcoding method of claim 12, wherein the distortion introduced by the requantization is compensated for by re-encoding subsequent affected regions.

14. The transcoding method of claim 11, further including the step of:

ending the modification of the bit rate once the calculated difference in bit count is eliminated.

15. The transcoding method of claim 14, wherein the step of ending the modification includes the step of:

determining whether the calculated difference in bit count is eliminated at a predetermined point in the re-encoded bit stream.

16. The transcoding method of claim 15, wherein the predetermined point is a midpoint of a macroblock slice.

17. The transcoding method of claim 16, wherein the predetermined point is an endpoint of a macroblock slice.

18. The transcoding method of claim 11, wherein the step of modifying the bit rate includes the step of:

randomly selecting a starting point within the frame to begin the modification of the bit rate such that perceptual problems that would otherwise be caused by the modification are minimized.

19. A transcoding method for inserting a visual element into an insertion region of an encoded bit stream representing a series of image frames, the transcoding method comprising the steps of:

receiving a first encoded bit stream;

decoding a copy of the first encoded bit stream to determine a position of a segment of an image frame;

comparing the insertion region to the position of the segment to determine if the visual element overlaps the segment;

combining the visual element with the segment if the visual element overlaps the segment;

determining if a motion vector is affected by the combination of the visual element and the segment;

modifying the affected motion vector;

re-encoding the segment; and outputting a second encoded bit stream, the second encoded bit stream being a combination of the first encoded bit stream and the re-encoded segment.

20. A transcoding method for inserting a visual element into an insertion region of an encoded bit stream, the transcoding method comprising the steps of:

receiving a first encoded bit stream representing an image;

decoding a copy of the first encoded bit stream to detect characteristics of respective segments of the image;

comparing the characteristics of the segments to the insertion region to determine if the insertion of the visual element into the image would affect the segments;

re-encoding the affected segments;

outputting a second encoded bit stream that is a combination of the first encoded bit stream and the re-encoded segments;

calculating a first bit count for the first encoded bit stream;

calculating a second bit count for the second encoded bit stream;

calculating a difference between the first bit count and the second bit count;

randomly selecting a starting point within the second encoded bit stream to begin modification of an output bit rate of the second encoded bit stream such that perceptual problems that would otherwise be caused by the modification are minimized; and modifying the output bit rate of the second encoded bit stream at the randomly selected starting point to eliminate the calculated difference in bit count from the second encoded bit stream.

* * * * *